US012734718B2

(12) United States Patent
Monteiro et al.

(10) Patent No.: US 12,734,718 B2
(45) Date of Patent: Sep. 15, 2026

(54) CUTTING DEVICE OF PIPE PRESERVATION SYSTEM

(71) Applicants: PETRÓLEO BRASILEIRO S.A.—PETROBRAS, Rio de Janeiro (BR); INSTITUTO DE PESQUISAS TECNOLÓGICAS DO ESTADO DE SÃO PAULO S.A., São Paulo (BR)

(72) Inventors: Murilo Costa Monteiro, Rio de Janeiro (BR); Leandro Aparecido Da Silva Albino, São Paulo (BR); Alessandro Guimarães, São Paulo (BR); Mario Henrique Fernandes Batalha, São Paulo (BR)

(73) Assignees: PETRÓLEO BRASILEIRO S.A.—PETROBRAS, Rio de Janeiro (BR); INSTITUTO DE PESQUISAS TECNOLÓGICAS DO ESTADO DE SÃO PAULO S.A., São Paulo (BR)

( * ) Notice: Subject to any disclaimer, the term of this patent is extended or adjusted under 35 U.S.C. 154(b) by 719 days.

(21) Appl. No.: 18/304,905

(22) Filed: Apr. 21, 2023

(65) Prior Publication Data

US 2023/0364819 A1 Nov. 16, 2023

(30) Foreign Application Priority Data

Apr. 22, 2022 (BR) ...................... 10 2022 007711 8

(51) Int. Cl.
*B26D 1/04* (2006.01)

(52) U.S. Cl.
CPC ..................................... *B26D 1/04* (2013.01)

(58) Field of Classification Search
CPC ........................................................ B26D 3/16
See application file for complete search history.

(56) References Cited

U.S. PATENT DOCUMENTS

| | | | |
|---|---|---|---|
| 1,811,894 | A | 6/1931 | Parker |
| 2,092,637 | A | 9/1937 | Brown |
| 3,067,651 | A | 12/1962 | Hogden |
| 3,443,648 | A | 5/1969 | Howard |
| 3,600,990 | A | 8/1971 | Renoux |
| 3,691,882 | A | 9/1972 | Massey |
| 3,704,639 | A | 12/1972 | Foss |
| 3,717,055 | A | 2/1973 | Pendleton |
| 3,733,939 | A | 5/1973 | Paysinger |
| 3,987,523 | A | 10/1976 | Nelson |
| 3,995,466 | A | 12/1976 | Kunsman |

(Continued)

FOREIGN PATENT DOCUMENTS

| | | |
|---|---|---|
| BR | 102019015918 | 2/2021 |
| CN | 105499653 | 4/2016 |

(Continued)

OTHER PUBLICATIONS

English description of KR 101067711 (Year: 2011).*

*Primary Examiner* — Alan Snyder
(74) *Attorney, Agent, or Firm* — Knobbe, Martens, Olson & Bear, LLP

(57) ABSTRACT

The present invention describes a cutting device (100) of pipe preservation system (PPS) comprising a body (3.1), a fitting guide (3.2), at least one cutting lever (3.4), at least one cutting blade (3.5), at least one receptacle (3.6) of the cutting blade (3.5), and at least one support structure (300).

16 Claims, 14 Drawing Sheets

(56) References Cited

U.S. PATENT DOCUMENTS

| | | | |
|---|---|---|---|
| 4,126,065 | A | 11/1978 | Clavin |
| 4,149,436 | A | 4/1979 | Blattler |
| 4,343,207 | A | 8/1982 | Paysinger |
| 4,345,376 | A | 8/1982 | Benson et al. |
| 4,437,366 | A | 3/1984 | Astle |
| 4,465,422 | A | 8/1984 | Blust, Sr |
| 4,576,070 | A | 3/1986 | Fitzgerald |
| 4,791,716 | A | 12/1988 | Konrad |
| 5,209,094 | A | 5/1993 | Edmonds, Jr. |
| 5,361,659 | A | 11/1994 | Hanson |
| 5,424,846 | A | 6/1995 | Bornhorst, Jr. |
| 5,605,083 | A | 2/1997 | Lupke |
| 5,946,993 | A | 9/1999 | Flanagan |
| 6,050,161 | A | 4/2000 | Tremblay |
| 6,189,424 | B1 | 2/2001 | Wheeling |
| 7,429,153 | B2 | 9/2008 | Dole et al. |
| 7,574,807 | B1 | 8/2009 | Fuller |
| 8,220,371 | B2 | 7/2012 | Benson |
| 8,720,070 | B2 | 5/2014 | Sterner |
| 8,827,607 | B1 | 9/2014 | Goodman |
| 10,022,801 | B1 | 7/2018 | Devaney |
| 10,393,368 | B2 | 8/2019 | Smith |
| 10,464,144 | B2 | 11/2019 | Choi |
| 10,625,345 | B1 | 4/2020 | Castille |
| 10,821,621 | B2 | 11/2020 | Breyer |
| 2007/0028451 | A1 | 2/2007 | Kaehr |
| 2010/0257981 | A1 | 10/2010 | Frick |
| 2011/0041658 | A1 | 2/2011 | Weinberg |
| 2011/0108149 | A1 | 5/2011 | Xiao |
| 2011/0167887 | A1 | 7/2011 | Lee |
| 2012/0017377 | A1 | 1/2012 | Hayden |
| 2012/0308321 | A1 | 12/2012 | Onishi |
| 2013/0061726 | A1 | 3/2013 | Katsu |
| 2014/0041492 | A1 | 2/2014 | Phillips, II |
| 2014/0260840 | A1 | 9/2014 | Mori |
| 2015/0090083 | A1 | 4/2015 | Conrad |
| 2015/0174661 | A1 | 6/2015 | Brandstrom |
| 2015/0298214 | A1 | 10/2015 | Arkwright |
| 2015/0321259 | A1 | 11/2015 | Weinberg |
| 2016/0271702 | A1 | 9/2016 | Karpachevskyy |
| 2018/0056408 | A1 | 3/2018 | Coakley |
| 2019/0126367 | A1 | 5/2019 | Tripp |
| 2019/0143430 | A1 | 5/2019 | Kundracik |
| 2019/0160544 | A1 | 5/2019 | Karpachevskyy |
| 2019/0160604 | A1 | 5/2019 | Weinberg |
| 2019/0277330 | A1 | 9/2019 | Pattok |
| 2019/0337107 | A1 | 11/2019 | Onushko |
| 2020/0139447 | A1 | 5/2020 | Kimura |
| 2020/0200004 | A1 | 6/2020 | Wang |
| 2020/0276659 | A1 | 9/2020 | Coakley |
| 2021/0129228 | A1 | 5/2021 | Pechstein |
| 2021/0394315 | A1 | 12/2021 | Garza, Jr. |
| 2023/0339132 | A1 | 10/2023 | Monteiro |
| 2023/0364819 | A1 | 11/2023 | Monteiro |
| 2023/0381873 | A1 | 11/2023 | Monteiro et al. |
| 2024/0001451 | A1 | 1/2024 | Monteiro et al. |

FOREIGN PATENT DOCUMENTS

| | | | | | |
|---|---|---|---|---|---|
| CN | 110802241 | | | 2/2020 | |
| CN | 113102784 | | | 7/2021 | |
| CN | 113798522 | | | 12/2021 | |
| DE | 20000092 | U1 | | 3/2000 | |
| DE | 20209579 | U1 | | 10/2003 | |
| DE | 202020101282 | U1 | | 3/2020 | |
| EP | 0 164 097 | | | 12/1985 | |
| FR | 2333625 | | | 7/1985 | |
| GB | 1392637 | | | 4/1975 | |
| GB | 2473741 | A | * | 3/2011 | ............... B23B 5/12 |
| IT | BO20130698 | | | 6/2015 | |
| JP | 60141404 | | | 7/1985 | |
| JP | 2747523 | | | 5/1998 | |
| KR | 101067711 | B1 | * | 9/2011 | ............. B23D 33/12 |
| KR | 101787684 | B1 | | 10/2017 | |
| RU | 180973 | U1 | | 7/2018 | |
| WO | WO 93/002825 | | | 2/1993 | |
| WO | WO 2012130361 | | | 10/2012 | |
| WO | WO 2018/164244 | | | 9/2018 | |

* cited by examiner

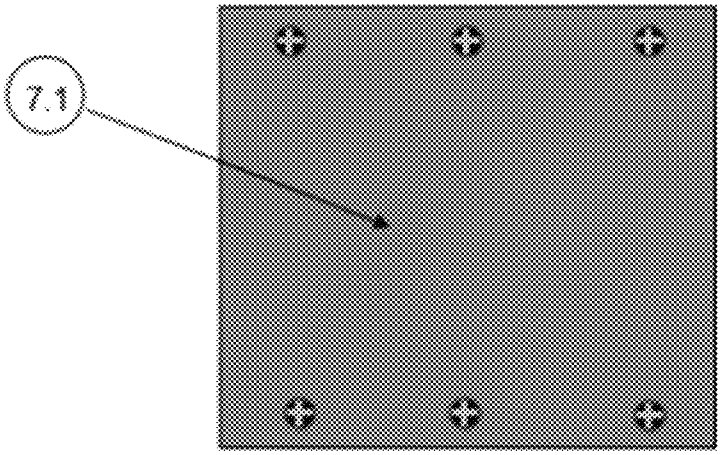
FIG. 7.1
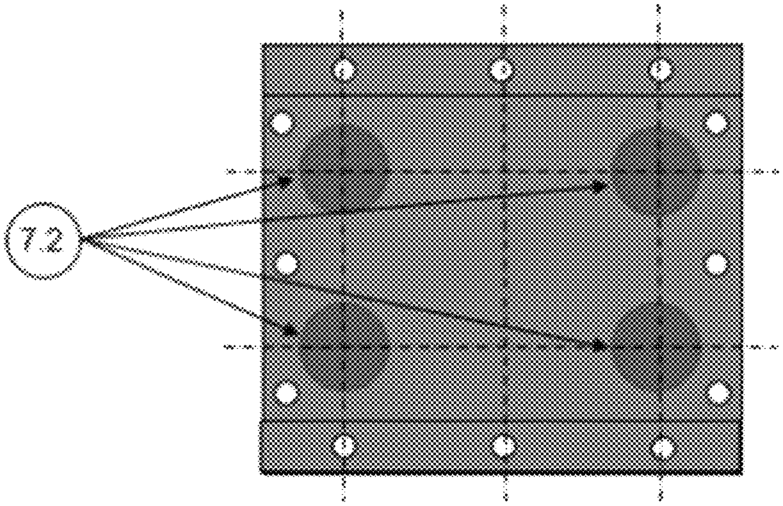
FIG. 7.2

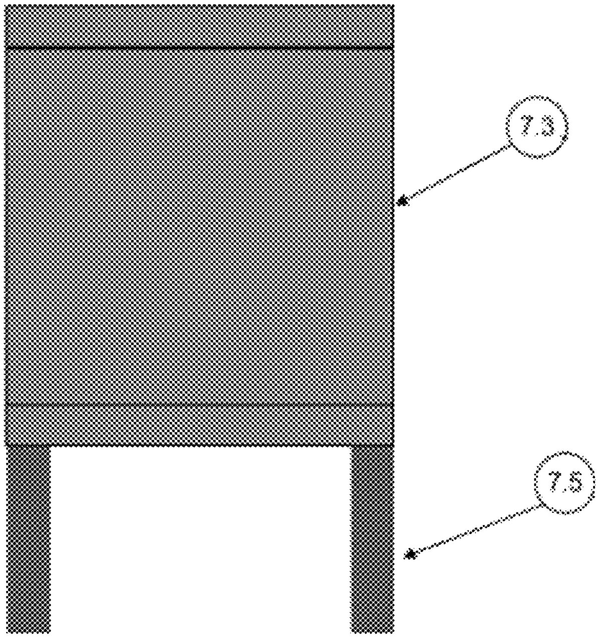
FIG. 7.3
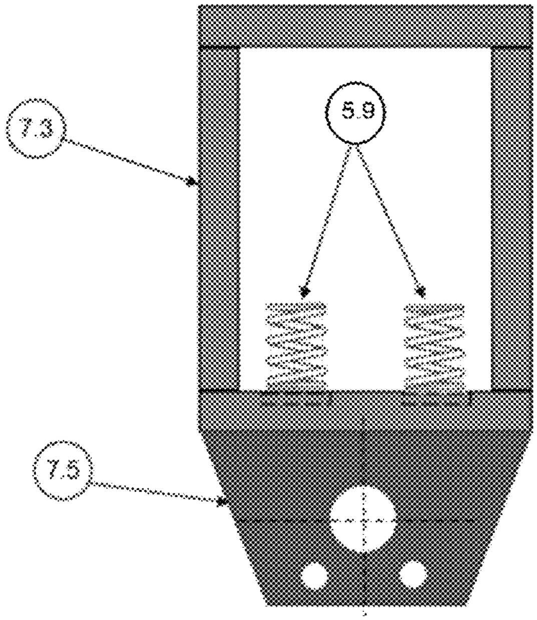
FIG. 7.4

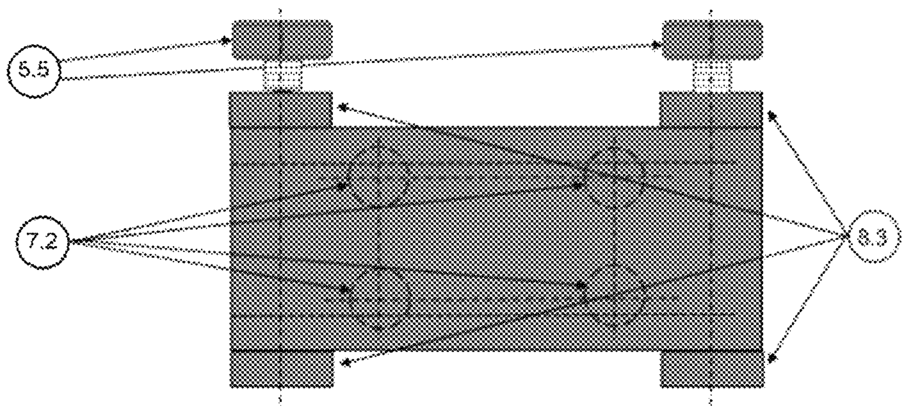
FIG. 8.1
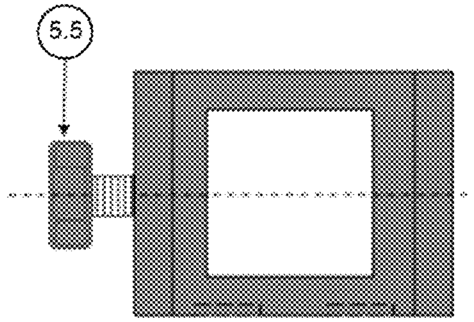
FIG. 8.2
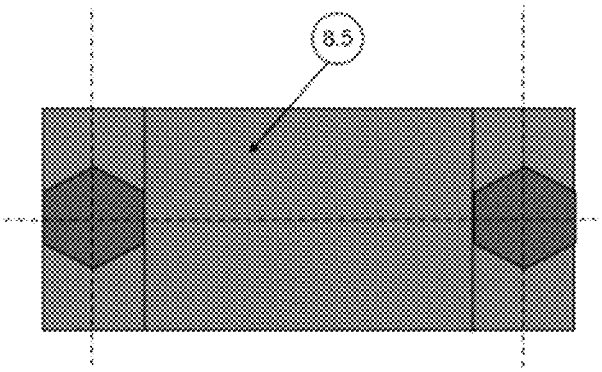
FIG. 8.3

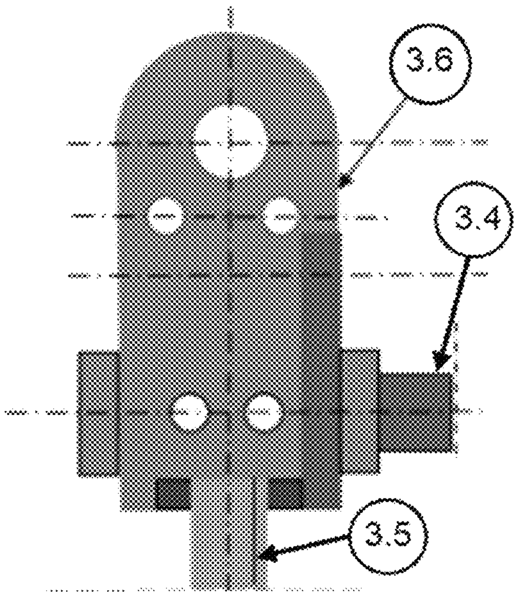
FIG. 9.1
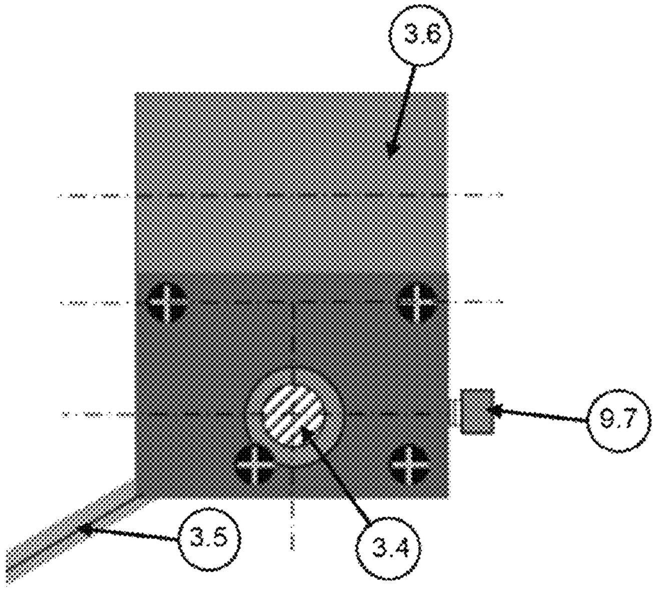
FIG. 9.2

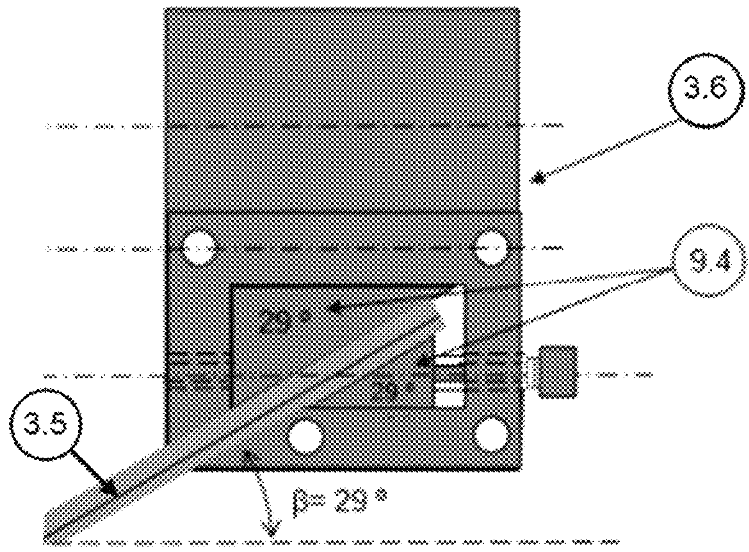
FIG. 9.3
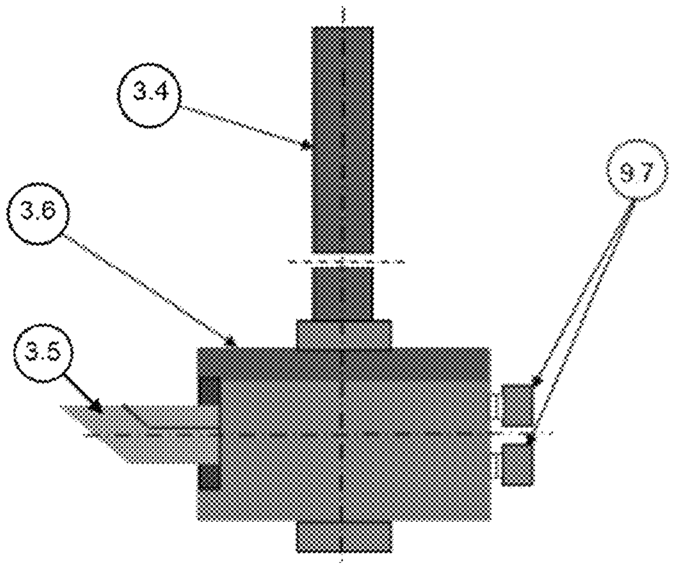
FIG. 9.4

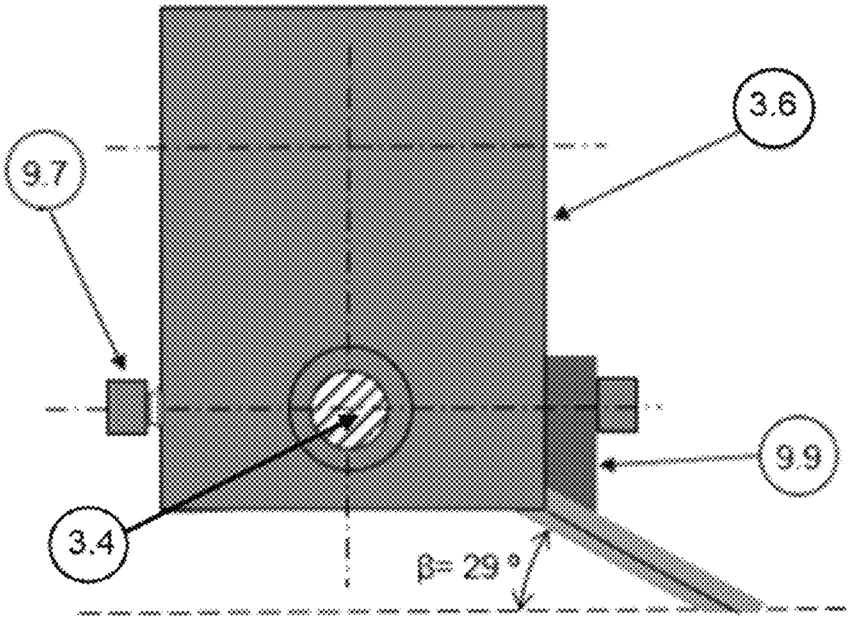
FIG. 9.5

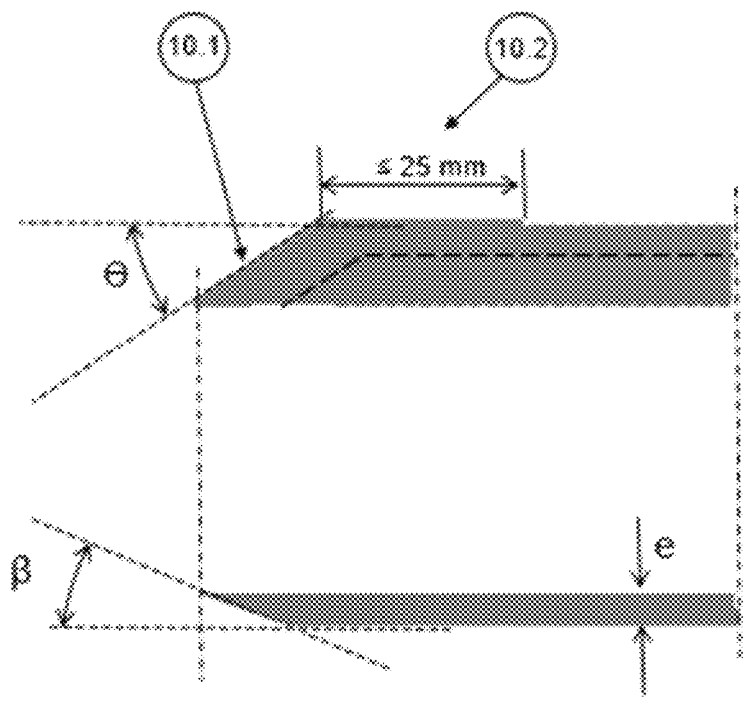
FIG. 10.1
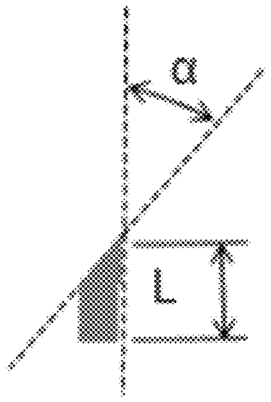
FIG. 10.2

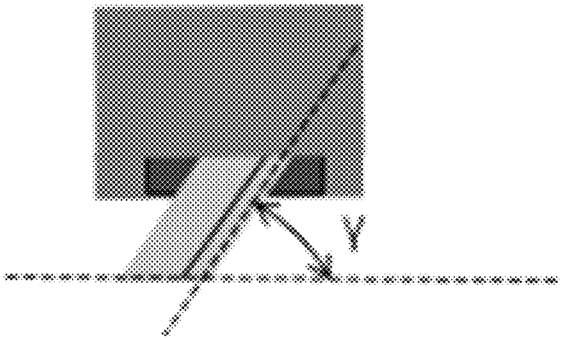
FIG. 10.3
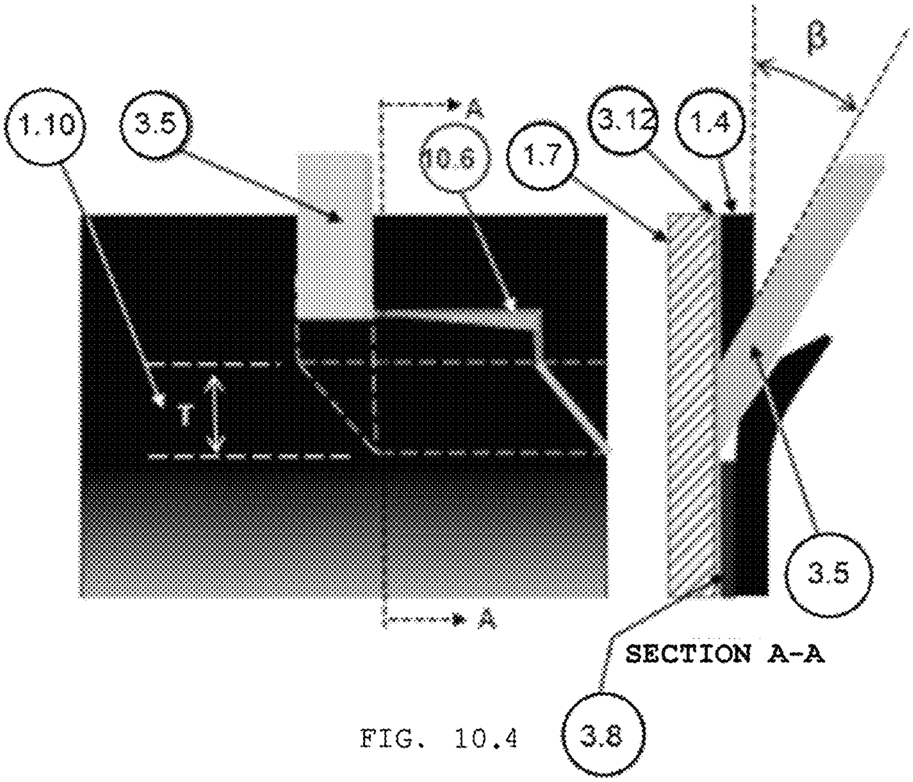
FIG. 10.4

CUTTING DEVICE OF PIPE PRESERVATION SYSTEM

FIELD OF THE INVENTION

The present invention pertains to the technical field of mechanical engineering, addressed to pipes with external coating, more specifically, the present invention is related to a device for cutting a pipe preservation system.

BACKGROUND OF THE INVENTION

Carbon steel pipes, when installed in fresh or salt water (called submarine pipelines or subsea or submerged pipelines), or onshore (called buried pipelines or terrestrial pipelines, buried pipelines) need an external anticorrosive protection (External Anticorrosive Coating). A classic type of external anticorrosive protection is the three-layer polyethylene (PE) coating (3-Layer PE Coating) and the three-layer polypropylene (PP) coating (3-Layer PP Coating), the former being used in onshore pipelines and the latter in subsea pipelines.

The three-layer polyethylene coating comprises a first layer of thermally curable epoxy powder (FBE, Fusion Bonded Epoxy), a second layer of copolymer adhesive and a third layer of polyethylene (PE). The three-layer polypropylene coating comprises a first layer of thermally curable epoxy powder (FBE, Fusion Bonded Epoxy), a second layer of copolymer adhesive and a third layer of polypropylene (PP). One way to differentiate the polyethylene coating from the polypropylene coating is by color, in which the external polyethylene coating is generally supplied in black and the polypropylene coating is generally white.

The external anticorrosive coating of three-layer steel pipes for onshore and subsea pipelines is performed at manufacturers with coating plants installed in Brazil, in accordance with Brazilian standards ABNT NBR 15221-1: External Anticorrosive Coating—Part 1: Polyethylene in three layers and ABNT NBR 15221-2: External Anticorrosive Coating—Part 2: Polypropylene in three layers. Abroad, the standard applied in most countries is ISO 21809-1—Petroleum and Natural Gas Industries, External Coating for Buried and Submerged pipelines used in Pipeline Transportation Systems—Part 1—Polyolefin Coatings (3-Layer PE and 3-Layer PP).

The aforementioned Brazilian and foreign Standards specify that the finish on the edge of the collar (cutback) must be chamfered at an angle of less than 30° in relation to the surface of the pipe, in the longitudinal direction, in order to ensure that the field joint accommodate in this area in order to occupy all the spaces, avoiding failures in this region. In addition, some specifications require that the FBE exposure band (FBE tail) be executed, where the width of the FBE exposure band varies according to the specifications of the buyers, and can vary from 1 mm to 5 mm or from 5 mm to 20 mm.

The manufacturing of the collar (cutback) by the brushing method, with regard to the finish of its chamfer, presents two disadvantages. The first disadvantage concerns the process, which is very aggressive, fraying the coating and causing stresses, which are added to the thermal stresses generated in the coating process; fast heating and cooling, gradually resulting in the detachment of the coating in the transition region, the coating and the collar. The second disadvantage is characterized by the non-uniformity of the surface, which prevents a correct accommodation of the field joint. Additionally, when pipes are stored in open-air locations, this phenomenon tends to intensify due to variations in temperature and humidity, since each layer of the coating and the pipe have different expansion coefficients and will move searching for stabilization, resulting in the detachment of the coating, allowing oxygen to enter under the FBE layer, initiating the corrosive process.

The exposure band of the FBE (FBE tail), made by machining, aims at mitigating the problems resulting from the manufacture of the collar by the brushing method, ensuring the overlap of the field joint in the region of the exposure band of the FBE, in order to make a smooth transition, avoiding void spaces that could favor the entry of oxygen, which initiates the corrosion process or causes loss of efficiency in the cathodic protection system. However, said problems are not completely overcome, considering that the machining of the FBE exposure band is carried out right after the pipe coating, in which stresses remain and the layers tend to move over time.

In this sense, the pipe preservation system (hereinafter PPS or PPS system) for onshore and/or submarine pipelines, object of patent process BR 102019015918-9 A2, provides the advantage of eliminating collar brushing (cutback) of externally coated pipes. With the elimination of collar brushing, the need arises to develop machines or devices that cut the external coating of the pipe for removal of the pipe preservation system (PPS).

Specifically, the pipe preservation system (PPS) generally comprises a cup that is mechanically connected to the pipe between an outer portion of the pipe and the external coating of the pipe. In this way, the cut in the external coating of the pipe needs to meet an angle required by the standard and guarantee the FBE exposure band (FBE tail), when specified by the buyer.

In addition, there is a need for a device to cut the external coating of the pipe and the pipe preservation system (PPS), precisely and quickly, for example, onshore pipelines in the field or submarine pipelines in a vessel or spool base, without causing damage to the pipe surface or the FBE layer.

STATE OF THE ART

In the state of the art, there are devices for cutting the external coating of pipes and devices for executing the exposure band of the FBE (FBE tail), which are performed by machining. However, these devices use the creation of the collar (cutback) by brushing or masking adhesive tape. In these cases, the machining of the external coating of the pipe is carried out starting from the end of the pipe towards the center, being carried out only by the manufacturer of the same.

The U.S. Pat. No. 8,720,070B2 discloses a device to remove a uniform layer of material from the outer surface of a polyethylene pipe, before the welding operation, in which said device can be used in the field. Said device for removing a uniform layer of material from the outer surface of a pipe comprises a body, a blade, a chain, a first fastener, wherein the first fastener is operable to fasten a first point of chain to the body, a grip chain, and wherein the grip chain includes a second fastener, in which the second fastener is operable to fasten a second point of the chain to the body. In addition, the device further includes an operable spring to cause said blade to exert a uniform downward pressure and a means of moving the blade upwards and overruling the spring operation to cause the blade to exert a uniform downward pressure.

Document U.S. Pat. No. 4,345,376A discloses a C-shaped pipe cutter comprising a rotatable frame relative to a pipe being cut, in a plane perpendicular to the pipe axis. The C-shaped pipe cutter comprises two diametrically opposed hubs centered on an axis through the center of the pipe to be cut. On the lower hub, there is a pressure screw and a cutting blade. In the upper hub, there is a tubular blade or carriage of circular cross section. The tubular blade receives a pressure screw that pushes or pulls the blade through a hexagonal bushing screwed into the outer end of the blade.

Document DE20209579U1 discloses a tool for peeling or cutting a layer, outer layers or the coating of a pipe, in particular, a plastic pipe or a plastic-coated pipe, wherein the tool for peeling or cutting comprises a C-shaped ring with a peripheral opening that allows the tool to be placed over the pipe in such a way that the C-ring surrounds the pipe over a central angle of more than 180°, allowing the tool to be guided around the pipe without a clearance. Furthermore, the tool comprises a knife disposed in the C-ring with a cutting edge projecting into and beyond the inner circle of the C-ring towards the pipe, such that the cutting edge is capable of penetrating the pipe surface. In addition, the tool comprises a receiving bearing to circularly support and guide the tool with respect to the pipe.

As can be seen from the description of the indicated documents of the state of the art, there are devices and tools to cut the external coating or pipe outer layers, which present solutions that include the use of chains around a pipe and C-shaped structures with tubular slide and bearings.

Although there are documents in the state of the art that address to the cutting of pipe external coatings, these do not present solutions for cutting a pipe preservation system (PPS), which is inserted between the outer portion of the pipe and the external coating applied to the pipe.

Therefore, there is a need for a device for cutting the external coating of the pipe and the pipe preservation system (PPS) with the subsequent removal of the latter, ensuring the execution of the collar chamfer angle and the exposure band of the FBE, according to the respective specifications.

BRIEF DESCRIPTION OF THE INVENTION

The present invention describes a cutting device of pipe preservation system (PPS) comprising a body, a fitting guide, at least one cutting lever, at least one cutting blade, at least one receptacle of the cutting blade and at least one support structure.

BRIEF DESCRIPTION OF THE FIGURES

In order to complement the present description and obtain a better understanding of the features of the present invention, and according to a preferred embodiment thereof, attached, a set of figures is presented, where in an exemplified, although not limiting, way, there is represented its preferred embodiment.

FIG. 7.1 represents a top view of the body of the cutting device of the pipe preservation system (PPS).

FIG. 7.2 represents a top view of the body of the cutting device of the pipe preservation system (PPS), without the cover.

FIG. 7.3 represents a front view of the body of the cutting device of the pipe preservation system (PPS).

FIG. 7.4 represents a side view of the body of the cutting device of the pipe preservation system (PPS).

FIG. 8.1 represents a top view of the fitting guide.

FIG. 8.2 illustrates a side view of the fitting guide.

FIG. 8.3 shows a rear view of the fitting guide.

FIG. 9.1 illustrates a side view of the cutting blade receptacle.

FIG. 9.2 represents a front view of the cutting blade receptacle.

FIG. 9.3 shows a front view of the cutting blade receptacle.

FIG. 9.4 illustrates a bottom view of the cutting blade receptacle.

FIG. 9.5 shows a front view of the cutting blade receptacle.

FIG. 10.1 represents a top view and a side view of the cutting blade.

FIG. 10.2 represents a right front view of the cutting blade.

FIG. 10.3 illustrates the lead angle of the cutting blade.

FIG. 10.4 shows a top view and a sectional view of the external coating of the pipe being cut.

DETAILED DESCRIPTION OF THE INVENTION

The cutting device of the pipe preservation system (PPS), according to the present invention, is directed, preferably, to carbon steel pipes, externally coated and with their ends preserved and protected by the pipe preservation system (PPS), as described in BR 102019015918-9 A2, called the PPS system or PPS. More specifically, the present invention refers to a cutting device of the pipe preservation system (PPS), developed to be installed on the bar of a stationary machine, an orbital machine or other machines whose purpose is to cut any external polymeric coating of pipes.

Figure 1:
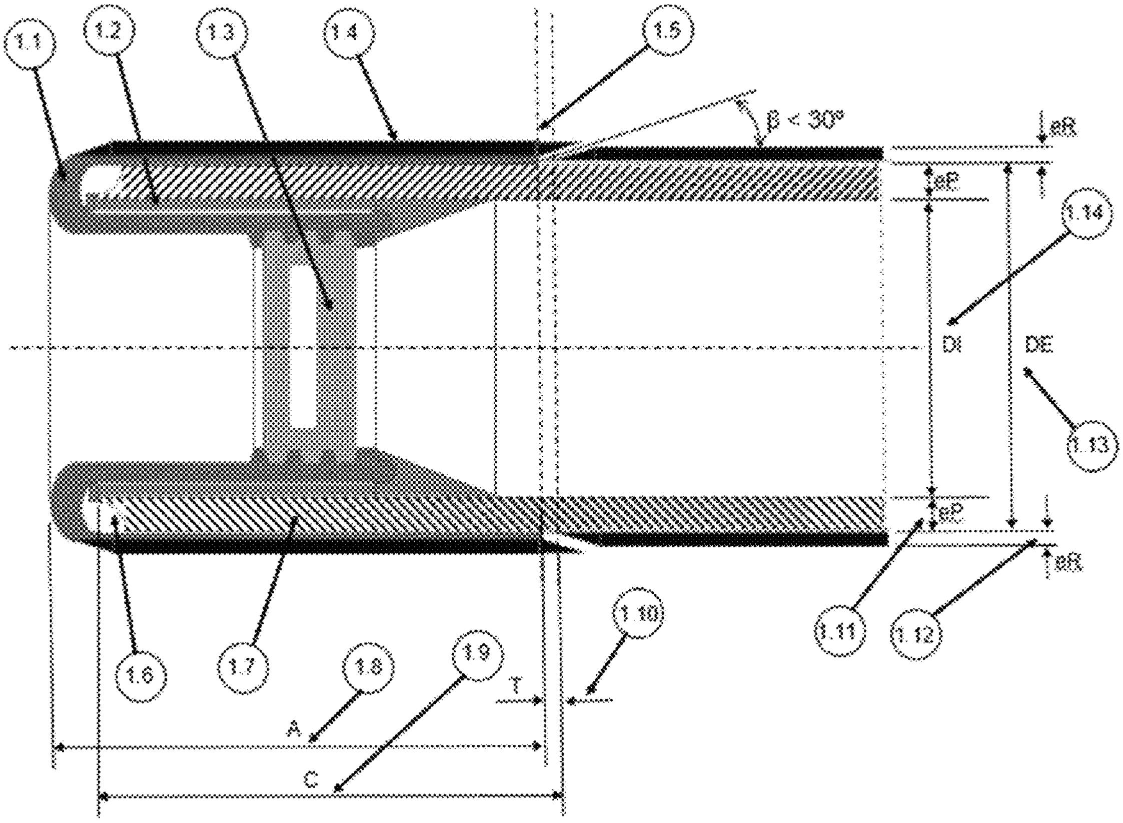
FIG. 1 shows a sectional view of a pipe preservation system (PPS) applied to a pipe.

FIG. 1 represents a sectional view of the pipe preservation system (PPS), according to an embodiment described in BR 102019015918-9 A2, applied to a pipe. FIG. 1 illustrates the pipe preservation system (PPS), which comprises a cup 1.1, a seal 1.2, a cover 1.3 and an external coating 1.4 of the pipe, these components being inserted by means of a specific coating method.

FIG. 1 also illustrates a cutting position 1.5, a collar chamfer angle $\beta$ (cutback) where $\beta$ is less than 30° ($\beta<30°$), a bevel 1.6, a pipe wall 1.7, a length of the outer flap A, 1.8, of the cup 1.1, the length of the collar (cutback) C, 1.9, a width of the exposure band of the FBE (FBE tail) T, 1.10, a thickness of the wall of the pipe eP, 1.11, a total thickness of the pipe external coating eR, 1.12, a pipe outer diameter DE, 1.13, and a pipe inner diameter DI, 1.14.

The pipe preservation system (PPS), represented in section in FIG. 1, is preferably applied to carbon steel pipes externally coated in three layers of polyethylene (PE) (3-Layer PE) or in three layers of polypropylene (PP) (3-Layer-PP), with outside diameters of the pipe ranging from 114.3 mm to 812.8 mm (from 4½ inches to 32 inches)

and with wall thicknesses of the pipe ranging from 6.35 mm to 50.8 mm (¼ inches to 2 inches).

In particular, the pipe preservation system (PPS), as described in BR 102019015918-9 A2, promotes an increase in the useful life of the coated pipes, which are stored in an open place and a decrease in their assembly time, resulting in construction and installation cost savings by reducing the blasting time in the field or on the vessel. Additionally, the use of the pipe preservation system (PPS) on pipes allows for eliminating the collar brushing operation at the plant, reducing the collar surface preparation time. Consequently, the application of the pipe preservation system (PPS) also provides a reduction in the bottleneck in the release of the joints in the field. In addition, the pipe preservation system (PPS) allows for mitigating environmental impacts.

Specifically, the total external coating thickness of the pipe 1.4 of three layers of polyethylene or three layers of polypropylene of the pipe preservation system (PPS), according to a preferred embodiment of the present invention, is in the range of 1.6 mm to 10 mm.

Figure 2:
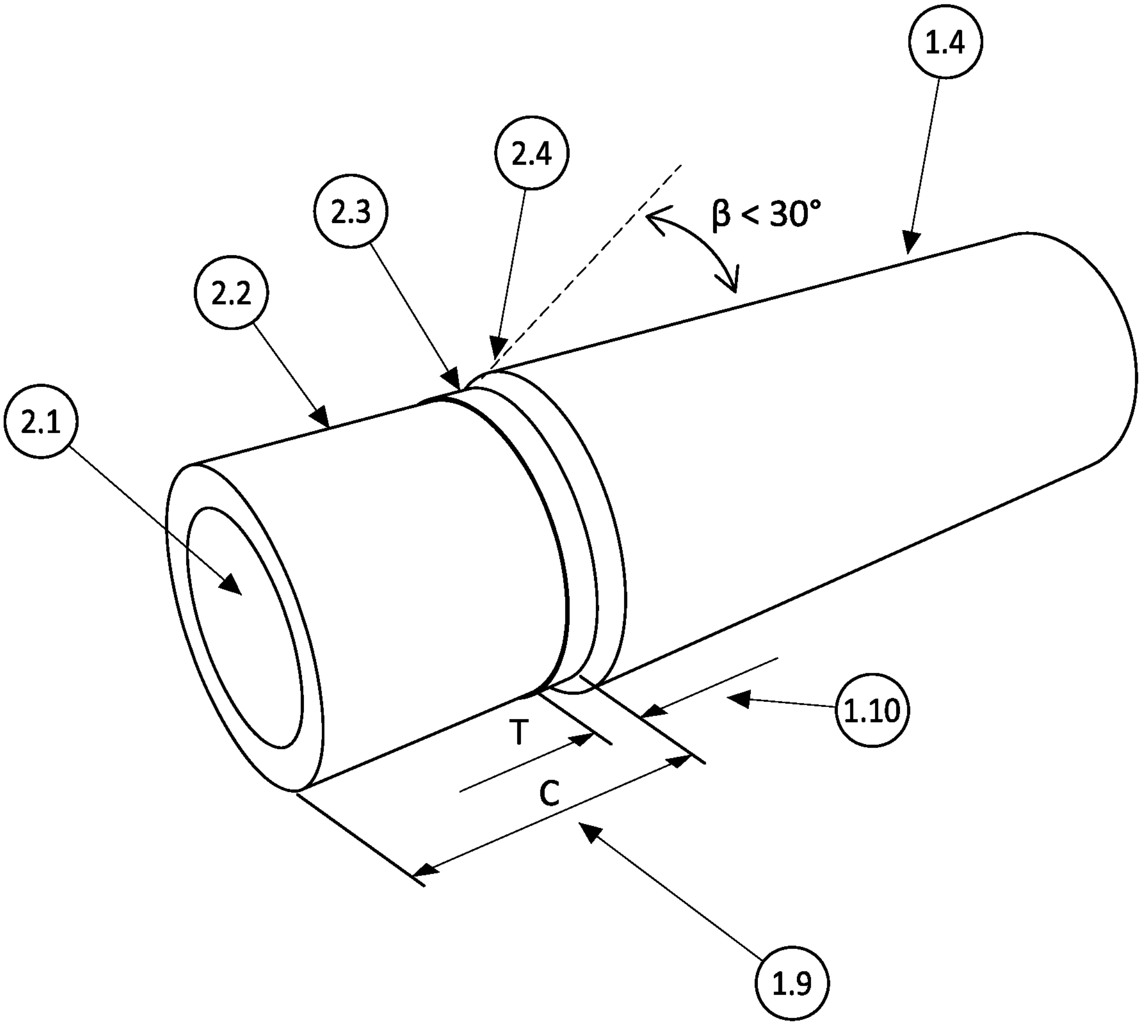
FIG. 2 represents the collar (cutback) of a pipe coated externally by three layers.

FIG. 2 represents a collar (cutback) 2.2 of a pipe 2.1 externally coated in three layers. In detail, FIG. 2 illustrates a pipe 2.1, the collar (cutback) 2.2, an FBE exposure band (FBE tail) 2.3, a collar chamfer (cutback) 2.4, a collar chamfer angle β (cutback) 2.4 where β is less than 30° (β<30°), an external coating of the pipe 1.4, a collar length (cutback) C, 1.9, and a width of the FBE exposure band (FBE tail) T, 1.10.

Regarding the collar (cutback) 2.2, the Brazilian Standards NBR 15221-1 and NBR 15221-2, define in item 3.6, collar (cutback) as: "Extensions of the pipes, from the face of the bevel to the polyethylene or polypropylene, located at both ends, which are left free of coating". The collar (cutback) 2.2, as shown in FIG. 2, has the main purpose of ensuring that the thermal input, generated during the welding of a joint, which joins two pipes, does not damage the external coating of the pipe 1.4. Additionally, the collar (cutback) 2.2 can be attached to a semi-automatic or automatic welding machine or ultrasonic equipment, as well as used as the scan area for weld inspection.

Specifically, the cutting device of the pipe preservation system (PPS), according to the present invention, is capable of cutting the collar (cutback), with a tolerance of ±5 mm in its specified length C, 1.9, contributing for greater dimensional accuracy, favoring the effectiveness of the field joint coating process. In this sense, the positioning of the cutting device of the pipe preservation system (PPS) of the present invention for cutting the collar (cutback) 2.2 is a function of the length of the outer flap A, 1.8, of the cup 1.1 and the thickness of the outer flap of the cup 1.1 of the pipe preservation system (PPS). The standard length of the collar (cutback) C, 1.9, as specified in the ABNT NBR 15221-1 and ABNT NBR 15221-2 standards for polypropylene in three layers, is 120 mm±10 mm, where the buyer can specify shorter or longer lengths, maintaining a tolerance of ±10 mm.

With respect to the FBE exposure band (FBE tail) 2.3, represented in FIG. 2, this is intended to mitigate coating detachment at the steel/coating interface and promote an overlap of the coating system of the field joint.

The angle β of the chamfer of the collar (cutback) 2.4, shown in FIG. 2, is defined by the angle in relation to the surface of the pipe 2.1, in the longitudinal direction, in order to allow the correct accommodation of the field joint. Preferably, the angle β of the collar chamfer (cutback) 2.4 is less than 30° (β<30°). Further, it is worth noting that the collar (cutback) 2.2 only needs and must be exposed at the time of the coupling for welding.

It should be noted that the angle β of the chamfer of the collar (cutback) 2.4 being less than 30° (β<30°) makes it unfeasible to use a cutting blade that is thin, such as that used in stilettos, which would cause its rupture, due to the bending moment in contact with the surface of the pipe, which is not regular. The angle β of the collar chamfer (cutback) causes the cutting blade to have a significant length, needing to be thick enough to support the efforts during cutting.

The width of the exposure band of the FBE (FBE tail) T, 1.10, represented in FIGS. 1 and 2, obtained by cutting with the cutting device of the pipe preservation system (PPS) 100 of the present invention, is preferably from 1 mm to 10 mm.

Regarding the chamfer of the collar (cutback) 2.4, shown in FIG. 2, after the cutting performed by the cutting device of the pipe preservation system (PPS) 100 of the present invention, preferably, this should have an angle β<30° (preferably, the angle β is less than 30°), this being an essential condition for chamfering, with a tolerance of +0-2°. Additionally, the collar chamfer (cutback) 2.4 must have a smooth, uniform and stress-free surface, favoring anticorrosion protection until the application of the field joint protection system. In this way, the cutting of the chamfer of the collar (cutback) 2.4 is done shortly before the installation in the field or at sea, ensuring enough time for the layers to settle and there are no residual stresses.

Figure 3:
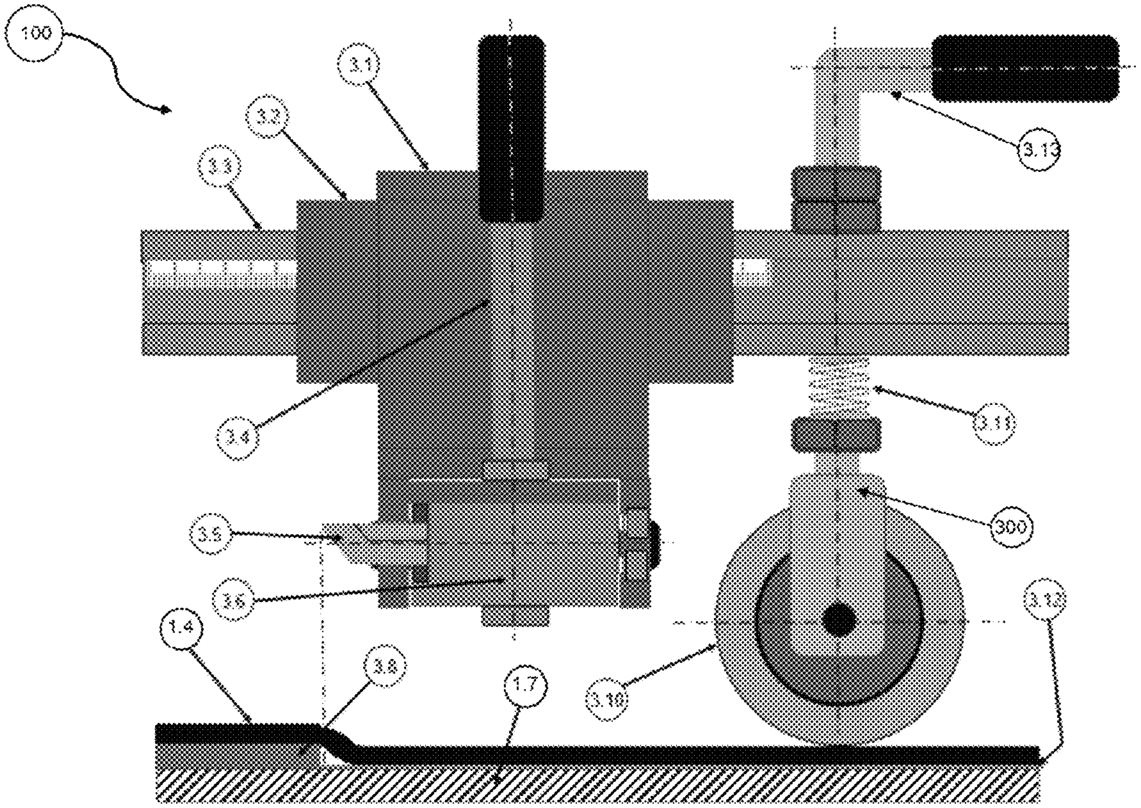
FIG. 3 represents a front view of the cutting device of the pipe preservation system (PPS) of the present invention with the cutting blade in the retracted position.

With reference to FIG. 3, this represents a front view of the cutting device of the pipe preservation system (PPS) 100, according to a preferred embodiment of the present invention, showing the cutting device of the pipe preservation system (PPS) 100 comprising at least one receptacle 3.6 of the cutting blade 3.5, in the retracted position, with the cutting lever 3.4 positioned at an angle of 0°, parallel, with respect to the body 3.1.

Furthermore, as further shown in FIG. 3, the cutting device of the pipe preservation system (PPS), 100 comprises a body 3.1, a fitting guide 3.2, at least one cutting lever 3.4, at least one receptacle 3.6 of the cutting blade 3.5, at least one support structure 300. Furthermore, FIG. 3 shows an external coating 1.4 of the pipe to be cut, an outer flap of the cup 3.8 of the PPS, a pipe wall 1.7 and a FBE layer 3.12.

Further, FIG. 3 shows a bar 3.3 of an orbital or stationary cutting machine, for example. The fitting guide 3.2 is arranged to receive the bar 3.3, coupling the same to the cutting device of the pipe preservation system (PPS) 100. According to a preferred embodiment of the present invention illustrated in FIG. 3, the bar 3.3 crosses the fitting guide 3.2.

Specifically, preferably, the at least one support structure 300 includes at least one support wheel 3.10 that maintains the correct positioning of the bar 3.3 of an orbital or stationary machine in the cutting device of the pipe preservation system (PPS), 100. Such a support structure 300 additionally included at least one rod 3.13, which is attached to the upper part of the bar 3.3, and at least one resilient mechanism of the support wheel 3.11, which is attached to the lower part of the bar 3.3. The rod 3.13 and the resilient mechanism of the support wheel 3.11, in collaboration with each other, guarantee the correct positioning of the bar 3.3 during the execution of the cut.

More particularly, according to a preferred embodiment of the present invention, the resilient mechanism of the support wheel 3.11 can be at least one helical spring, as illustrated in FIG. 3, or any other resilient mechanism, or the combination of more than one resilient mechanism, such as a leaf spring, an air pocket controlled by an automated air pressure control system, or a resilient material, for example.

Regarding the outer flap 3.8 of the cup 1.1 of the PPS system, there is no coating under the same, and, therefore, this part gets loose, as seen in FIG. 3. When performing the cut by the cutting device of the pipe preservation system (PPS) 100, according to the present invention, the tip of the cutting blade 3.5 passes close to the part of the outer flap 3.8 of the cup 1.1 of the PPS system, which does not have a coating, causing it to detach, forming a continuous regular line, making way for the blade to penetrate.

Figure 4:
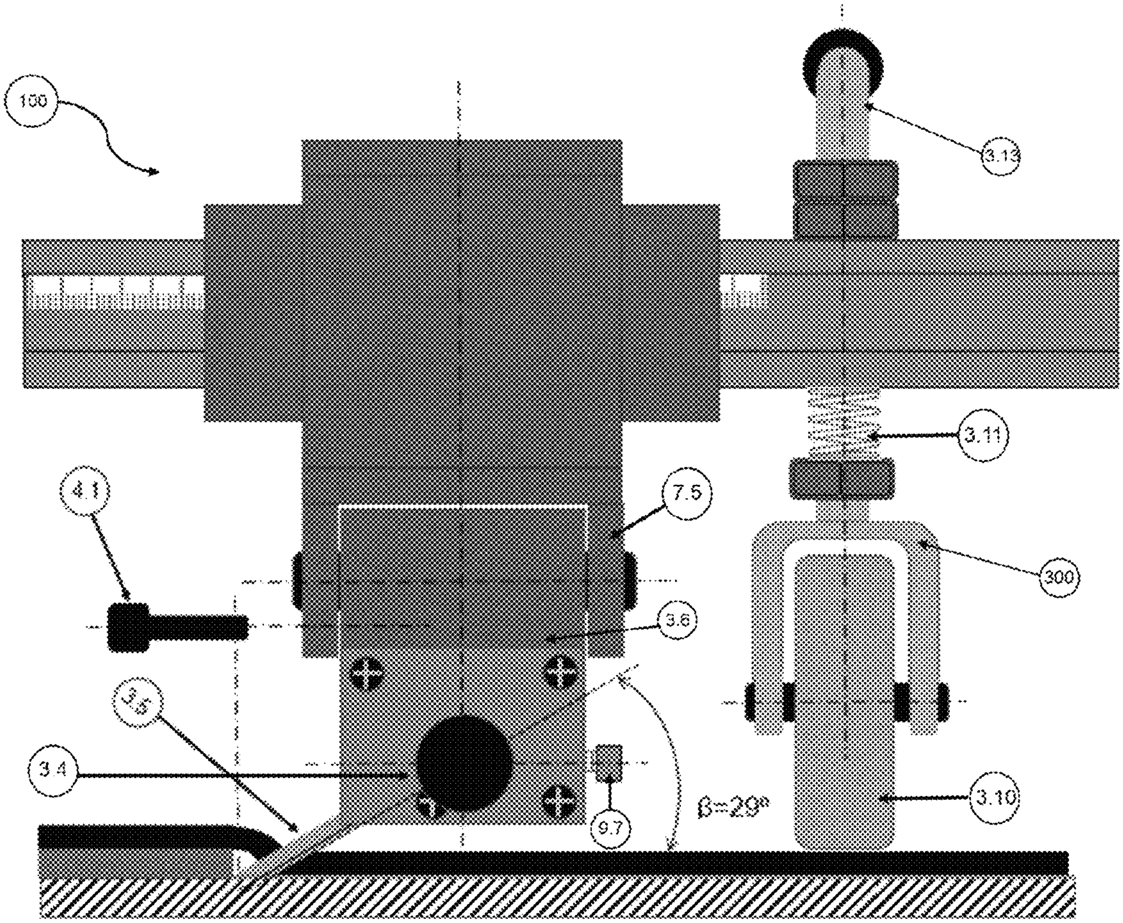
FIG. 4 represents a front view of the cutting device of the pipe preservation system (PPS), with the cutting blade in the cutting position.

In turn, FIG. 4 represents a front view of the cutting device of the pipe preservation system (PPS) 100, showing the cutting blade 3.5 arranged in a cutting position, preferably, with an angle β of the chamfer of the collar (cutback) equal to 29° (β=29°) in relation to the surface of a pipe 2.1, in the longitudinal direction, and in which the cutting lever 3.4 is activated and is in the horizontal position, perpendicular to the body 3.1. FIG. 4 further shows at least one attachment means of the cutting blade 9.7 and a locking means of the cutting blade receptacle 4.1.

According to a preferred embodiment of the present invention, the locking means of the cutting blade receptacle 4.1 is inserted into a support 7.5 of the cutting blade receptacle, passing through the receptacle 3.6 of the cutting blade, in order to lock the receptacle 3.6 of the cutting blade and ensure the correct positioning of the cutting blade 3.5 to carry out the cut by the cutting device of the pipe preservation system (PPS) 100 of the present invention.

Each of the attachment means of the cutting blade 9.7 and the locking means of the cutting blade receptacle 4.1 can be any attachment means commonly used or the combination of more than one attachment means, such as, for example, at least one of or a combination of screws, screws with or without washers or nuts, rivets, pins, keys.

Figure 5:
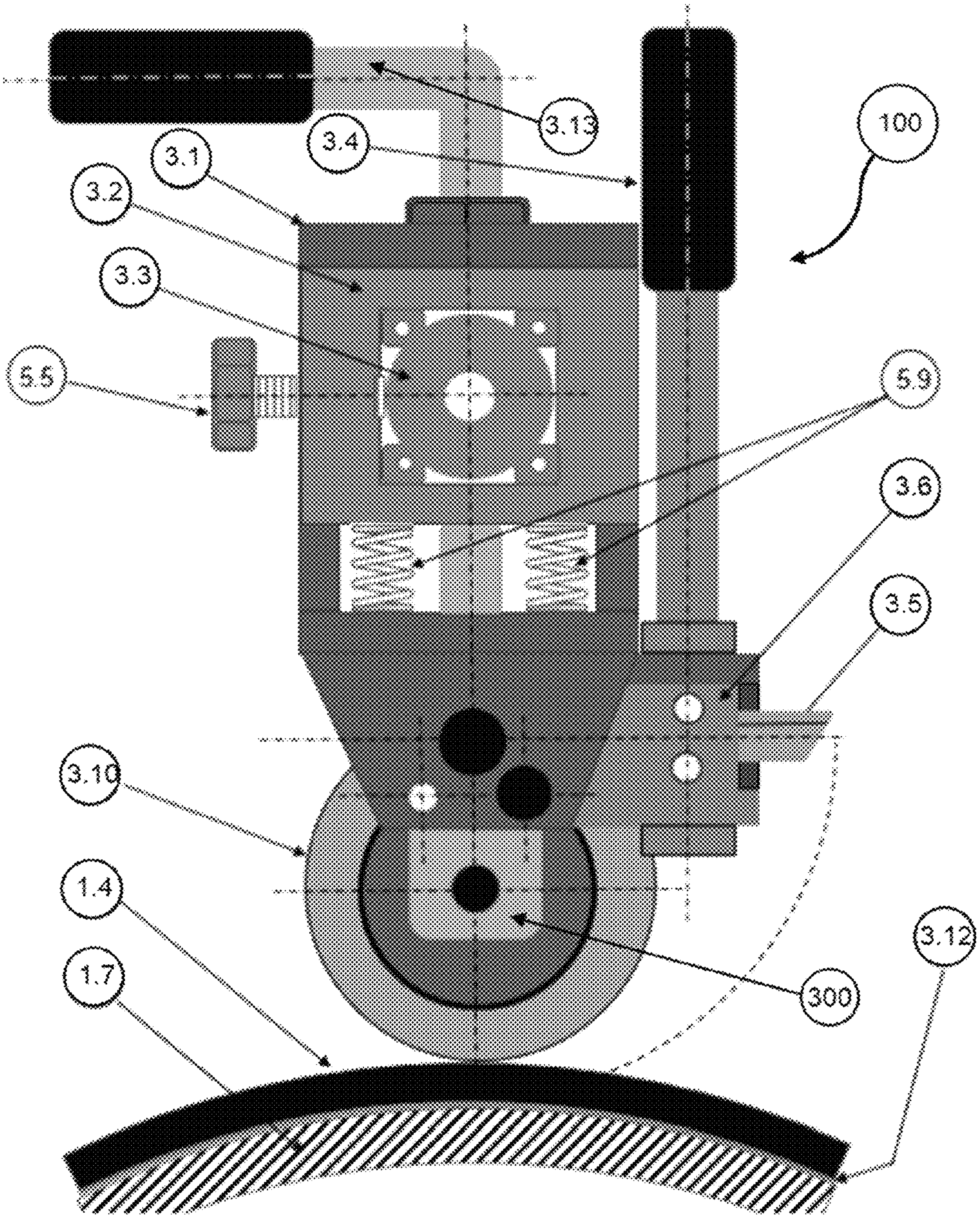
FIG. 5 represents a side view of the cutting device of the pipe preservation system (PPS), with the cutting blade in the retracted position.

FIG. 5 illustrates a side view of the cutting device of the pipe preservation system (PPS) 100, in which the cutting blade 3.5 is in a retracted position, with the cutting lever 3.4 at an angle of 0°, parallel, in relation to body 3.1; wherein the receptacle 3.6 of the cutting blade is in a fully retracted position, with an angle of 0°; and in which the cutting lever 3.4 is in the retracted position, with an angle of 0° in relation to the body 3.1.

In addition, FIG. 5 illustrates the body 3.1, the fitting guide 3.2, the bar 3.3 of the cutting machine, at least one setting means 5.5 of the cutting position, the support wheel 3.10, the external coating of the pipe 1.4, the pipe wall 1.7, at least one pressure mechanism 5.9 of the cutting blade 3.5 and the FBE layer 3.12.

The at least one setting means 5.5 of the cutting position allows adjusting and ensuring the correct positioning of the cutting device of the pipe preservation system (PPS) 100 in relation to the pipe 2.1 and the cutting machine, during the cutting operation. According to a preferred embodiment of the present invention, as shown in FIG. 5, the at least one setting means 5.5 is inserted in the fitting guide 3.2 and comes into firm/tight contact with the bar 3.3 of the cutting machine, performing the attachment of bar 3.3 in a desired position, allowing the correct positioning of the cutting device of the pipe preservation system (PPS) 100 in relation to the pipe 2.1 and the cutting machine, during the cutting operation.

According to FIG. 5, according to a preferred embodiment of the present invention, the at least one setting means 5.5 of the cutting position is a screw, and the setting of the positioning of the cutting device of the PPS 100 in relation to the pipe 2.1 and to the cutting machine is carried out by tightening and loosening said screw. The at least one setting means 5.5 of the cutting position can be any setting means that provides the adjustment of the position of the cutting device of the pipe preservation system (PPS) 100 in relation to the pipe 2.1 and the cutting machine, as at least one or a combination of: any type of screw, screw with or without washers or nuts, rivets, pins, keys.

The at least one pressure mechanism 5.9 ensures that the cutting blade 3.5 of the PPS is pressed on the FBE layer 3.12 without removing or damaging the same. The pressure mechanism 5.9 additionally has the purpose of allowing the cutting blade 3.5 of the PPS to follow the surface imperfections and any ovality existing in the pipe. In addition, the pressure mechanism 5.9 employs the function of absorbing shocks due to irregularities on the outer surface of the pipe.

With respect to the bar 3.3, shown in FIG. 3 and FIG. 5, this can be made in a solid or hollow square profile in laminated carbon steel or extruded aluminum, for example. More particularly, the bar is the structural element of the cutting machine that holds attached the cutting device of the pipe preservation system (PPS) 100 and its parallelism with respect to the surface of the pipe.

Figure 6:
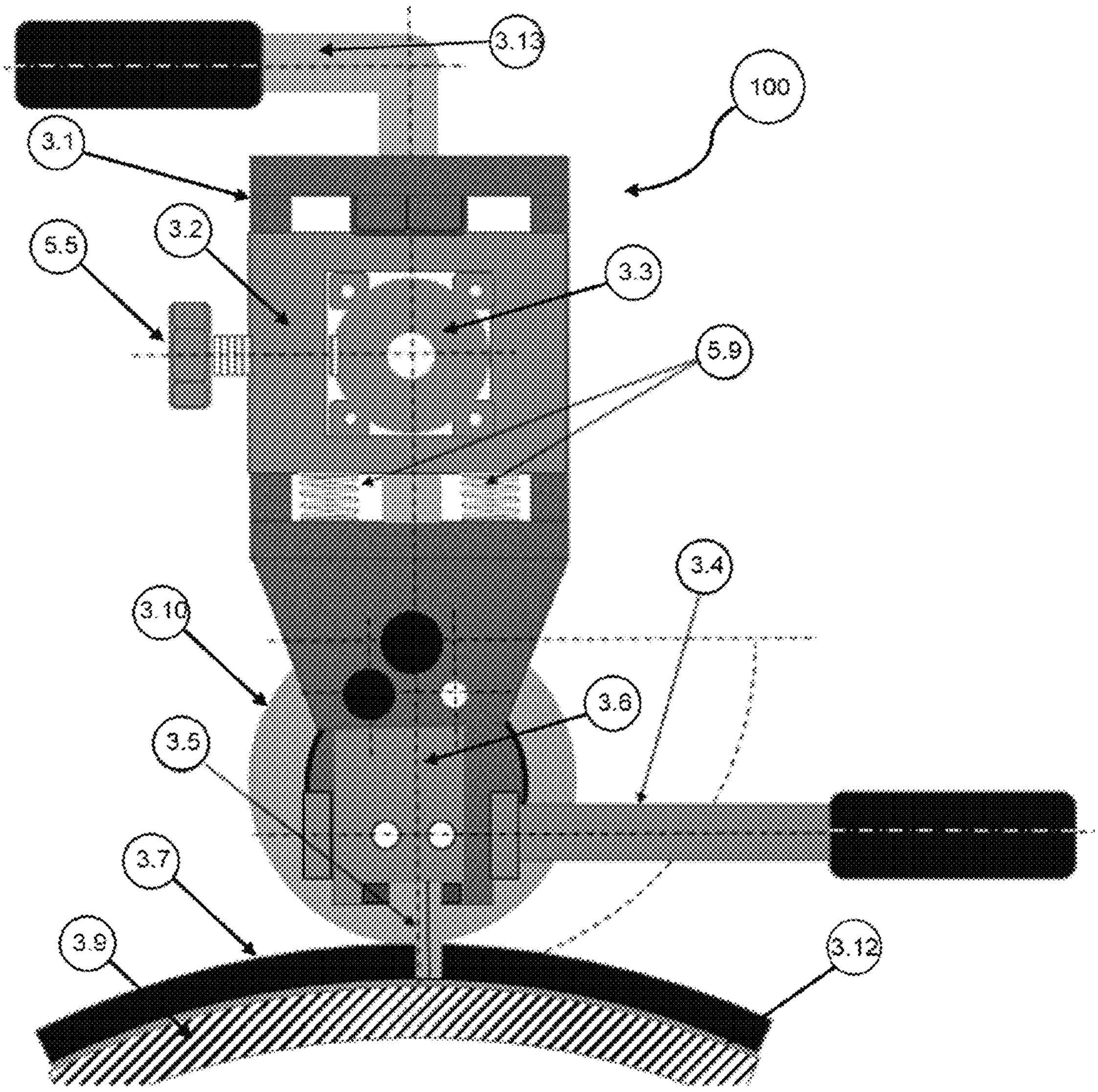
FIG. 6 represents a side view of the cutting device of the pipe preservation system (PPS), with the cutting blade in the cutting position.

FIG. 6 represents a side view of the cutting device of the pipe preservation system (PPS) 100 with the cutting blade 3.5 in a cutting position, with the cutting lever 3.4 at a 90° angle in relation to the body 3.1; and wherein the receptacle 3.6 of the cutting blade is fully lowered, in a cutting position, at the full depth of cut.

Furthermore, based on FIG. 6, it is possible to observe at least four pressure mechanisms 5.9, which according to this preferred embodiment of the present invention, are at least four springs 5.9 that are pressed, keeping the cutting blade 3.5 pressed and absorbing impacts during the cut.

Furthermore, according to FIG. 6, it is possible to observe the cutting blade 3.5 touching the first FBE layer 3.12.

In particular, the at least one pressure mechanism 5.9 may be at least one of or the combination of: carbon steel spiral springs with dimensions and coefficient k designed not to damage the FBE layer 3.12; an air pocket controlled by an automated air pressure control system; leaf spring; and resilient material, for example.

FIG. 7.1 represents a top view of the body 3.1 of the cutting device of the pipe preservation system (PPS), 100, in which the body 3.1 comprises a cover 7.1.

FIG. 7.2, on the other hand, illustrates a top view of the body 3.1 of the cutting device of the pipe preservation system (PPS), 100, without the cover 7.1, showing at least four cradles 7.2 of the at least four pressure springs 5.9.

FIG. 7.3 represents a front view of the body 3.1 of the cutting device of the pipe preservation system (PPS), 100, indicating its side walls 7.3 and the support 7.5 of the cutting blade receptacle.

FIG. 7.4 shows a side view of the body 3.1 of the cutting device of the pipe preservation system (PPS), 100, indicating its side walls 7.3, the support 7.5 of the cutting blade receptacle and at least two pressure mechanisms 5.9.

With reference to the body 3.1 of the cutting device of the pipe preservation system (PPS), 100, represented in more detail in FIGS. 7.1, 7.2, 7.3, and 7.4, preferably, this is a rigid rectangular box in laminated carbon steel, comprising a screw-on cover 7.1, at least four cradles 7.2 of the pressure mechanism, side walls 7.3, the at least four pressure mechanisms 5.9 and the support 7.5 of the receptacle of the cutting blade. The side walls 7.3 of the body 3.1 are connected to the fitting guide 3.2.

FIG. 8.1 illustrates a top view of the fitting guide 3.2, wherein it is possible to observe the at least one setting means 5.5 of the cutting position, the at least four cradles 7.2 of the pressure mechanism and the at least four vertical guides 8.3.

FIG. 8.2 illustrates a side view of the fitting guide 3.2, where it is possible to observe at least one setting means 5.5.

In turn, FIG. 8.3 shows a rear view of the fitting guide 3.2.

In more detail, the fitting guide 3.2, preferably, can be made of laminated carbon steel. Additionally, the fitting guide 3.2 is coupled to the bar 3.3 of a cutting machine, so that it slides easily, but without clearances that allow it to swing.

Specifically, the setting screws 5.5 of the cutting position, preferably, can be made of laminated carbon steel. The setting screws 5.5 of the cutting position are installed on the front or rear part of the fitting guide 3.2 and serve to attach the fitting guide 3.2 on the bar 3.3 in a firm way to avoid deviation in the cut.

In an additional reference to the body 3.1 of the cutting device of the pipe preservation system (PPS), PPS, 100, represented in more detail in FIG. 7, the same fits in the vertical guides 8.3 of the fitting guide 3.2, which is represented in FIG. 8.1. The body 3.1 slides following the movement of pressure mechanism 5.9.

FIG. 9.1 shows a side view of the receptacle 3.6 of the cutting blade, illustrating the cutting lever 3.4 and the cutting blade 3.5.

FIG. 9.2 represents a front view of the receptacle 3.6 of the cutting blade, wherein the receptacle 3.6 is shown with its cap and part of the cutting blade 3.5, which is on the left side. Furthermore, FIG. 9.2 illustrates at least one of the attachment screws of the cutting blade 9.7 and the representation of the hole (with hatches) where the cutting lever 3.4 is arranged.

FIG. 9.3 shows a front view of the receptacle 3.6 of the cutting blade, wherein the receptacle 3.6 is shown without its cap and with the cutting blade 3.5 on the left side. In addition, FIG. 9.3 illustrates at least one of the attachment screws of the cutting blade 9.7.

In more detail, FIG. 9.3 also shows at least one template 9.4 of the cutting blade, inside the receptacle 3.6 of the cutting blade 3.5. According to the exemplary embodiment of FIG. 9.3, two templates 9.4 are illustrated, where the templates 9.4 have a triangular shape. The triangular templates 9.4 are positioned in the receptacle 3.6 of the cutting blade and adjusted to ensure that the angle β of the collar chamfer (cutback) is less than 30°, in which, according to the exemplary embodiment of FIG. 9.3, the angle β of the collar chamfer (cutback) is equal to 29° (β=29°).

FIG. 9.4 illustrates a bottom view of the receptacle 3.6 of the cutting blade, indicating the at least two attachment screws of the cutting blade 9.7, the cutting lever 3.4 and the cutting blade 3.5.

FIG. 9.5 shows a front view of the receptacle 3.6 of the cutting blade, representing at least one of the attachment screws of the cutting blade 9.7, the cutting blade 3.5 on the right side at an angle β of the collar chamfer (cutback) equal to, preferably, 29° and with at least one support shim 9.9 of the cutting blade 3.5 and the representation of the hole (with hatches) where the cutting lever 3.4 is arranged.

In particular, the receptacle 3.6 of the cutting blade, preferably, can be made of laminated carbon steel. Furthermore, as also previously illustrated in FIGS. 5 and 6, the receptacle 3.6 of the cutting blade is articulated through the movement of the cutting lever 3.4, in which the receptacle 3.6 of the cutting blade can be positioned from 0° to 90°.

In addition, as seen in FIGS. 9.2, 9.3 and 9.5, the receptacle 3.6 of the cutting blade houses the cutting blade 3.5 and can be positioned both in the left and right positions, making it possible to adapt the same for cutting at both ends of a pipe.

Preferably, the receptacle 3.6 of the cutting blade can be adjusted for blades from 3 mm to 12 mm thick and from 10 mm to 25 mm wide.

As illustrated in FIGS. 9.3 and 9.5, the receptacle 3.6 of the cutting blade is preferably adjusted so that the collar chamfer angle β(cutback) is less than 30° (β<30°), exemplified as being equal to 29° (β=29°) in such FIGS. 9.3 and 9.5. The collar chamfer angle β (cutback) can be adjusted, according to each particularity, by adjusting the triangular templates 9.4, which are represented in FIG. 9.3.

Regarding at least one support shim 9.9 of the cutting blade, shown in FIG. 9.5, this is used to support the cutting blade. As an example, to cut an external coating with a total thickness of more than 5 mm, the cutting blade 3.5 can be supported with the support shim 9.9.

In addition, the support shim 9.9 is preferably screwed into threaded holes in the receptacle 3.6 of the cutting blade.

FIG. 10.1 represents the cutting blade 3.5 of the cutting device of the pipe preservation system (PPS), PPS, in its top and side views, respectively.

The cutting blade 3.5 can, for example, be made using commercial materials, available in abundance on the market, such as standardized blades for stilettos, wood chisels and cutting tools for lathes, since the coatings are made of polymeric material, in the preferred embodiment of the invention, polyethylene (PE) and polypropylene (PP). In addition, the cutting blade 3.5 can be replaced with a sharpened or new one.

Preferably, the thickness of the cutting blade has a thickness range of 3 mm to 12 mm.

In the top view, represented at the top of FIG. 10.1, it is possible to identify the cutting edge 10.1 of the cutting blade 3.5 for the cut of the exposure band of the FBE (FBE tail) 2.3; and the respective sharpening angle θ of the cutting edge of the cutting blade 3.5 for cutting the exposure band of the FBE (FBE tail) 2.3.

In addition, according to the top view, represented in the upper part of FIG. 10.1, it is possible to identify the cutting edge 10.2 of the external coating of the pipe 1.4, which is indicated having a length, preferably, of less than or equal to 25 mm (25 mm). Preferably, the cutting blade 3.5 is made of laminated or forged carbon steel, with the faces to be sharpened (cutting edges) hardened. The length of the hardening of the cutting edge of the external coating of pipe 1.4 is preferably a maximum of 25 mm, as shown in FIG. 10.1.

Further, according to FIG. 10.1, the side view of the blade, positioned at the lower part of said FIG. 10.1, shows the thickness e of the cutting blade 3.5, as well as the angle β of the collar chamfer (cutback). The thickness e of the cutting blade 3.5 is preferably from 3 mm to 12 mm, and the thickness e of the cutting blade 3.5 depends on the thickness e and on the type of external coating of the pipe 1.4 to be cut.

The angle θ of sharpening of the cutting edge of the cutting blade 3.5 for cutting the exposure band of the FBE (FBE tail) 2.3, preferably, is greater than or equal to the angle β of the collar chamfer (cutback).

In turn, the width of the exposure band of the FBE (FBE tail) T, 1.10, obtained by cutting with the cutting device of the pipe preservation system (PPS), 100, is, preferably, a function of the width L of the cutting blade 3.5, a sharpening angle α for cutting the external coating of the pipe 1.4, the angle β of the chamfer of the collar (cutback) 2.4 and a lead angle γ of the cutting blade 3.5. The width of the exposure band of the FBE (FBE tail) T, 1.10, is preferably in the range of 1 mm to 10 mm per cut, depending on the cutting machine used. The tolerance in cutting the width of the exposure band of the FBE (FBE tail) T, 1.10, can be variable, being in the range of 1 mm to 5 mm and 5 mm to 20 mm, for example. Furthermore, after cutting, the width of the FBE exposure band (FBE tail) T, 1.10, when specified by the buyer, must be executed by removing the entire layer of copolymer adhesive (second layer of the external coating of the pipe) without causing damage to the FBE, at the specified width T, 1.10.

FIG. 10.2 represents a right front view of the cutting blade 3.5, showing the sharpening angle α of cutting the external coating 1.4 of the pipe and the width of the cutting blade L. Particularly, according to a preferred embodiment of the present invention, the cutting sharpening angle α of the external coating of pipe 1.4 is defined as a function of the best cutting performance, being in the range of 15° to 35°.

Additionally, the sharpening angle α of the cutting blade 3.5 makes it possible to cut the external coating 1.4 of the pipe without tearing, fraying, glazing, wrinkling or becoming a paste, following a uniform line along the circumference of the pipe, i.e., the finishing of the cut results in a uniform and clean surface, maintaining the original characteristics of the applied coating.

FIG. 10.3 represents the lead angle γ of cutting blade 3.5. According to a preferred embodiment of the present invention, the lead angle γ is defined as a function of the difficulty of penetrating the cutting blade 3.5 in the external coating 1.4 of the pipe to be cut, being in the range of 30° to 90°.

It is worth mentioning that an important point in the execution of the cut is the initial penetration in the external coating of the pipe 1.4, which has a significant hardness; for example, polyethylene (PE) has a shore hardness D (t=1 s) of at least 60 and polypropylene (PP) of at least 65, according to Table A.3 of ABNT NBR 15221-1 and ABNT NBR 15221-2 standards, respectively. These PE and PP coatings are designed to withstand impacts of at least 7 Joules/mm of thickness of the PE or PP coating, according to Table C.2 of the aforementioned Standards. In order to overcome this resistance, the cutting blade 3.4 should preferably be pointed and have, if necessary, a lead angle γ.

FIG. 10.4 shows a top view and a sectional view of the external coating 1.4 of the pipe being cut. The top view of the external coating 1.4 of the pipe being cut identifies the width of the exposure band of the FBE (FBE tail) T, 1.10, the cutting blade 3.5 and the cut 10.6 made on the external coating 1.4 of the pipe. Furthermore, in the sectional view (section A-A) of the external coating 1.4 of the pipe being cut, it is possible to observe the pipe wall 1.7, the FBE layer 3.12, the outer flap of the cup 3.8 and the cutting blade 3.5.

In a complementary way, with respect to the cutting blade 3.5, it can be heated by electrical resistance, electromagnetic induction, infrared or another heat source, except for flame, in order to facilitate penetration and increase the cutting speed. The temperature range, minimum and maximum, is defined according to the material of the external coating of the pipe to be cut.

In particular, the heated cutting blade can only touch the external coating of pipe 1.4 during turning; so, it must be retracted before the pipe or cutting machine stops turning, in order to prevent the generated heat from damaging the finishing of the collar chamfer (cutback). The maximum temperature will always be 10% below the Softening Temperature (VICAT) of the third layer of the coating to be cut, which for polyethylene (PE) is 115° C. and for polypropylene (PP) is 145° C., according to Table A.3, of the ABNT NBR 15221-1 and ABNT NBR 15221-2 Standards, respectively. Based on this premise, the temperature of the cutting blade cannot be higher than 100° C. for polyethylene (PE) and 130° C. for polypropylene (PP).

It is worth noting that cutting the PPS does not damage the cup 1.1 of the PPS system, as well as the other components of the same, allowing reuse and/or recycling.

The depth of cut of the PPS is a function of the outer diameter and the total thickness of the external coating 1.4 of the pipe; therefore, the cutting machines are calibrated based on these parameters.

Regarding the practical execution of the PPS cutting, using the cutting device of the pipe preservation system (PPS), 100, a description of a preferred embodiment of the present invention is presented.

The PPS cutting device 100 is positioned at the end of the outer flap 3.8 of the cup 1.1 of the PPS system, where there is no coating under the same.

The beginning of the cut is represented by the movement of the cutting lever 3.4, which moves the receptacle 3.6 with the cutting blade 3.5 against the external coating of the pipe 1.4 gradually deepening until it touches the FBE layer 3.12, using the same as support.

The cut is started with the cutting blade 3.5 facing the external coating 1.4 of the pipe and, as the rotation of the cutting machine and the pipe is being developed, the depth of the cut is increased until the cutting blade 3.5 touches the FBE layer 3.12, as represented in FIGS. 6 and 10.4, peeling off the second layer of copolymeric adhesive. The FBE layer 3.12 is smooth and cohesive, favoring the peeling process of the copolymeric adhesive, which has a minimum thickness of 200 μm (0.2 mm), both for the three-layer PE coating and for the three-layer PP coating.

Therefore, the cut shall overlap the initial area of the external coating 1.4 of the pipe to ensure that the entire layer of copolymer adhesive over the exposure band of the FBE (FBE tail) 2.3 is removed and that the full depth of cut is achieved across the entire circumference of the pipe, allowing the consequent withdrawal of the pipe preservation system (PPS).

To prevent excessive pressure from the cutting blade 3.5 on the FBE layer 3.12 to peel it off, the cutting device of the pipe preservation system (PPS), 100, according to the present invention, uses the pressure mechanism 5.9.

The length of the cutting lever 3.4, represented in FIG. 3, allows the penetration of the cutting blade 3.5 easily, firmly and safely. The cutting lever 3.4 can be screwed both on the front and on the rear part of the receptacle 3.6 of the cutting blade, allowing the cut to be made at both ends of the pipe (left and right sides) and with the cutting machine turning in the clockwise or counterclockwise, using the same receptacle 3.6 as the cutting blade. The cutting lever 3.4 can be moved by an electric, hydraulic or pneumatic mechanism in an automated or manual way, for example.

The cutting speed is a function of the material and thickness of the external coating of the pipe 1.4.

Those skilled in the art in the technical field of mechanical engineering will value the knowledge presented herein and will be able to reproduce the invention in the presented embodiments and in other variants, encompassed by the scope of the appended claims.

The invention claimed is:

1. A cutting device of a pipe preservation system (PPS), comprising:

a body;

a fitting guide attached to the body, wherein the fitting guide is coupled to a bar;

a receptacle coupled to the body by a support;

a cutting lever attached to the receptacle;
a cutting blade disposed within the receptacle and positioned adjacent a side of the body; and
a support structure coupled to the bar and configured to maintain the body at a distance from a pipe, the support structure comprising:
a support wheel;
a resilient mechanism coupled to the support wheel at a lower part of the bar; and
a rod coupled to an upper part of the bar.

2. The cutting device of claim 1, wherein the cutting lever is moveable between a vertical position, parallel to the body and a horizontal position, perpendicular to the body.

3. The cutting device of claim 2, wherein the cutting lever is configured to move the cutting blade between a cutting position and a retracted position.

4. The cutting device of claim 3, wherein when the cutting blade is in the cutting position, the cutting blade is at an angle (B) less than 30° relative to a longitudinal surface of the pipe.

5. The cutting device of claim 3, wherein the cutting blade is in the retracted position when, the cutting lever is parallel to the body, and the cutting blade is in the cutting position when, the cutting lever is perpendicular; in relation to the body.

6. The cutting device of claim 1, further comprising a setting means of a cutting position, the setting means comprising one or more of a screw, a rivet, a pin, or a key, coupled to the fitting guide to secure the cutting device to a desired position on the bar.

7. The cutting device of claim 1, further comprising a pressure mechanism, positioned between the receptacle and the body, the pressure mechanism configured to maintain the cutting blade in contact with the pipe.

8. The cutting device of claim 1, wherein the resilient mechanism is selected from the group consisting of a helical spring, a leaf spring, an air pocket controlled by an automated air pressure control system, and a resilient material.

9. The cutting device of claim 1, wherein the cutting blade is attached to the receptacle by one or more of a screw, washer, nut, rivet, pin, or key.

10. The cutting device of claim 1, further comprising a cutting blade receptacle lock.

11. The cutting device of claim 1, wherein positioning of the cutting device for cutting collar of the pipe is a function of a length and thickness of an outer flap of a cup of the pipe.

12. The cutting device of claim 1, wherein the receptacle comprises a template for positioning the cutting blade at a desired angle, the at least one-template comprising a triangular shape.

13. The cutting device of claim 1, further comprising a support shim positioned adjacent the cutting blade.

14. The cutting device of claim 1, wherein an angle of sharpening of a cutting edge of the cutting blade is greater than or equal to an angle of a chamfer of a collar of the pipe.

15. The cutting device of claim 1, wherein a sharpening angle of the cutting blade is greater than or equal to 15° and less than or equal to 35°.

16. The cutting device of claim 1, wherein a lead angle (Y) of the cutting blade is from 30° to 90°.

* * * * *